United States Patent [19]

Chang et al.

[11] 4,436,552

[45] Mar. 13, 1984

[54] METHOD OF FURNACE OPERATION WITH HIGH PELLET BURDENS

[75] Inventors: Melvin C. Chang, Charlotte, N.C.; John L. Howell, North Huntingdon, Pa.

[73] Assignee: United States Steel Corporation, Pittsburgh, Pa.

[21] Appl. No.: 406,422

[22] Filed: Aug. 9, 1982

[51] Int. Cl.³ ............................................. C21B 5/00
[52] U.S. Cl. ...................................................... 75/41
[58] Field of Search ..................................... 74/41, 42

[56] References Cited

U.S. PATENT DOCUMENTS 1,945,341  1/1934  Brassert .................................. 75/41
4,129,437  12/1978  Taguchi et al. ......................... 75/41

OTHER PUBLICATIONS

Poreromo, "Blast Furnace Burden & Gas Distribution", *I & S M*, Jul. 1979, pp. 22–34.

Primary Examiner—M. J. Andrews
Attorney, Agent, or Firm—W. Gary Goodson

[57] ABSTRACT

A method is described for producing metal such as iron in a shaft furnace wherein greater than about 80 percent of the ore therein is present in the form of pellets. The improvement involves adding fine ore material to the furnace adjacent to the walls of the furnace, and wherein the fine material is sufficiently fine to reduce the gas flow and protect the furnace lining. Preferably the fine ore material is obtained by separation from the pellets, and is added to the furnace on a controlled basis. Subsequent to separating the fine ore material from the pellets and prior to adding it to the furnace, the ultrafine fraction which would either create material handling problems or be blown out of the furnace when introduced is either (1) separated from the fine fraction which is added to the furnace, or (2) micro-pelletized prior to addition to the furnace in order to provide a material having suitable properties for flowing into the furnace.

24 Claims, 1 Drawing Figure

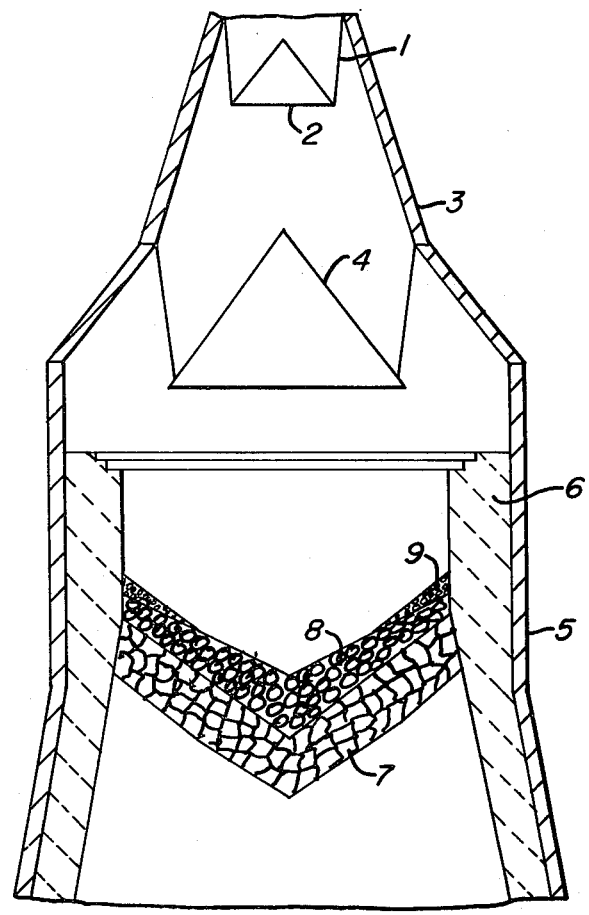

METHOD OF FURNACE OPERATION WITH HIGH PELLET BURDENS

FIELD OF THE INVENTION

This invention relates to a method of utilizing ore fines in a shaft furnace which utilizes high percentages of ore pellets.

BACKGROUND OF THE INVENTION

The two principal means for utilizing iron-ore fines for use in a blast furnace are by sintering or pelletizing. The preferred use of either method is normally dictated by location and the type of ore available. However, blast furnaces using a high percentage of ore pellets, greater than 80 percent, can have drawbacks attributable to the physical characteristics of the pellets. Namely, more pellets will roll toward the center of the blast furnace because of their spherical shape than will coke which has an irregular shape. The concentration of higher quantities of pellets in the center of the furnace results in higher quantities of coke at the wall and leads to two primary disadvantages in the operation of a blast furnace. The nonuniform packing of burden materials results in high reducing gas flows near the wall of the furnace which in turn results in (1) a decrease in furnace efficiency, i.e. lower productivity and higher coke rates, and (2) an increase in the rate of furnace lining erosion with associated increasing heat losses which result in a decrease in furnace campaign life. For example, the campaign life of a blast furnace for iron ore pellets is often about 2 years under these conditions. In addition to very high cost of relining the furnace, there is the costly shutdown time, often 2 to 3 months while this relining takes place.

One method to eliminate the deleterious results from the physical characteristics of pellets was disclosed in U.S. Pat. No. 4,129,437, incorporated herein by reference, which presents a method for producing larger sized pellets and then crushing them to eliminate the spherical shape and increase surface area. This will increase the angle of repose of the crushed pellets over spherical pellets to approach that of sinter and coke. This results in more uniform distribution of burden materials. However, this method has the significant drawback of requiring the construction of large new crushing and screening facilities. There are also problems associated with the production of large size, good quality pellets suitable for making the crushed pellets.

SUMMARY OF THE INVENTION

This invention relates to a method for producing metal such as iron in a shaft furnace wherein greater than about 80 percent of the ore therein is present in the form of pellets. The improvement involves adding fine ore material to the furnace adjacent to the wall of the furnace, and wherein the fine ore material is sufficiently fine to reduce the gas flow and protect the furnace lining. Preferably the fine ore material is obtained by separation from the ore pellets, and is added to the furnace on a controlled basis. Subsequent to separating the fine ore material from the pellets and prior to adding it to the furnace, an ultrafine fraction which would either create material handling problems or be blown out of the furnace when introduced therein is either (1) separated from the fine fraction which is added to the furnace, or (2) micro-pelletized prior to addition to the furnace in order to provide a material having suitable properties for flowing into the furnace.

This invention makes possible overcoming the prior art problems of reduced furnace efficiency add shortend furnace campaign life without the necessity of constructing new, costly facilities. For example, the campaign life of a shaft furnace for iron ore treating may be increased from about 2 years to as long as about 10 years or more. With the cost of re-lining a large shaft furnace currently running in the range of tens of millions of U.S. dollars, the significant economic advantages of this invention become immediately apparent.

In the case of unscreened pellets the amount of fine ore material next to the wall would normally not be sufficiently concentrated to produce the results described in this invention. In addition, there would be variations due to segregation of the fines in handling, but this would not produce the results of this invention because of the lack of controlled addition to the blast furnace to produce the desired concentration of fine ore material next to the wall.

BRIEF DESCRIPTION OF THE DRAWING

The drawing shows the top of a bell blast furnace with a layer of coke, a layer of pellets, and pellet chips on top of the pellet layer near the furnace wall.

DESCRIPTION OF THE PREFERRED EMBODIMENT(S)

The fine ore material of this invention is a finely divided ore containing material which when added to the shaft furnace adjacent to the wall of the furnace is sufficiently fine to reduce the gas flow and thereby protect the furnace lining, and sufficiently coarse to enable the fine material to remain into the furnace without being blown off by the furnace gases. Preferably, the fine ore material has a screen size of less than about 7 mm, and more preferably has a screen size of between about 1 mm and 6 mm.

The fine ore material, for example, can amount to between about 2 and about 20 weight percent of the original pellet weight when the minus 6 mm fines are screened from iron ore pellets, such pellets having a screen size of between about 7 mm and about 16 mm.

If this minus 6 mm fine ore material is then re-screened, for example, over a 3 mm screen to thereby produce a 3 by 6 mm fraction, the material flow problem can be solved. This double screened material is referred to herein as "pellet chips". This recovered 3 by 6 mm fraction of fine ore material has a high bulk density with low porosity, and may be as much as 30 to 70 weight percent of the minus 6 mm fraction obtained by screening.

If the fine ore material is selectively placed next to the furnace wall, the furnace efficiency and lining life can be improved. Tests run on a full-scale, blast-furnace burden-distribution model, confirmed that the selective use of fine ore material as part of the charge sequence could decrease permeability at the wall by as much as a factor of 7 and improve overall distribution across the radius of the furnace. Due to the limitation of the model, these tests were made using 12½ percent by weight of fine ore material of the total ore pellet burden. Subsequent tests on a commercial blast furnace for processing iron ore have substantiated the benefits of the use of fine ore material. When utilizing one 3.5 percent pellet chip in a furnace burdened with 100 percent pellets, a substantial decrease in coke rate by as much as 90 lb/ton of hot metal and a decrease in wall temperatures by as much as 200° F. were obtained when compared to similar operations without the chips. The use of fine ore material ranging from plus 1 mm up to 7 mm in quantities ranging between about 1 and about 20 percent by weight, and preferably between about 3 and 10 percent of the total ore pellet burden should be effective in achieving beneficial results. The same results are not achieved by not screening the pellets or by using screened pellets without using the fine ore material.

Preferably the fine ore material is added as a separate layer on top of the pellet layer in the blast furnace. This provides the advantage of decreasing the flow of gases next to the furnace wall. Also this fine ore material results in less coke being next to the furnace wall.

The fine ore material suitable for use in this invention may be obtained in a number of different ways. A preferred way is by double screening the iron ore pellets. Air classification is an alternate way. The ultrafine fraction may be discarded or may be micro-pelletized to produce fine material having suitable flow properties to be able to be charged into the furnace and retained therein during operation.

Micropellets of the ultrafine fraction may be formed by means of a balling device such as a balling disc. Also, the micropellets may be formed by adding one or more binders to the fine material. Micropellets formed for use in this invention may, if so desired, undergo a drying step prior to being injected into the shaft furnace.

It is also possible to form micropellets by processing the entire fine ore material of this invention without first separating out an ultrafine fraction.

Fine ore material suitable for use in this invention may also be mill scale, ore fines, sintered ore fines, or even non-ore material such as slag fines, or other relatively fine particulate material having the desired properties for use according to the teachings of this invention.

The ore pellets of this invention preferably have a screen size of between about 5 and about 20 mm.

The shaft furnace of this invention may be fueled by coke, or may be a direct-reduction shaft furnace, fueled, for example, by natural gas.

Preferably, the ore in the shaft furnace is at least about 90 weight percent in the form of pellets, and more preferably is substantially all in the form of pellets, other than recycled materials or that which is added as fine ore material adjacent to the walls of the furnace.

The drawing shows the top of a bell blast furnace comprising a small bell hopper where the charge to the furnace is first introduced, and the small bell 2 which works to allow the charge to be deposited in the large bell hopper 3, and the large bell 4 which works to allow the charge to be deposited into the furnace comprising furnace wall 5 and furnace lining 6. Coke layer 7 is positioned on top of other layers not shown. Screened pellet layer 8 is positioned on top of coke layer 7. Pellet chip layer 9 is positioned on top of pellet layer 8 adjacent to the furnace lining 6.

Various methods of charging the furnace and various types of furnaces are within the scope of the invention.

The fine ore material of this invention may be placed in various locations in the different layers. However, it is preferred to place the fine ore material on top of the ore pellet layer, and more preferably in every fourth ore pellet layer in the furnace.

EXAMPLE 1

In a full-scale model of a blast furnace having a radius of about 10½ feet, pellet chips are added at the furnace wall to the top of the ore layer (which layer has an average thickness of 20 inches) in a charging sequence of OOCCSC/CCOOC*. Bore samples through the vertical depth of all of the layers are taken. The pellet (including pellet chips) to coke ratio of the bore samples at the 6 ft. and 9 ft. radii from the center of the furnace are about 3.3 and about 3.4, respectively. This compares to the 6 ft. and 9 ft. bore samples for the identical system except that the pellet chips are absent of about 2.7 and about 2.3, respectively. Thus we see, by way of example, the increased amount of fine ore material that is present at the furnace wall in accordance with this invention.

("O" refers to pelletized ore; "C" refers to coke, and "S" refers to stones.)

EXAMPLE 2

A 3 by 6 mm finely divided iron ore material is prepared by double screening iron ore pellets, such pellets having a screen size of minus 19 mm. This finely divided material is added to a large commercial blast furnace for processing iron ore. The charge sequence in use for the furnace was OOCCSC/OOCCC, and the iron ore portion of the burden was 100 percent iron ore pellets. The fine ore material is placed in the bottom-half of the second ore skip of the second large bell dump every fourth charge. The weight of the fine ore material therefore amounts to about 1/32 (3.13%) of the total weight of the iron ore charge. Thermocouples in the lower part of the furnace stack show the highest temperatures drop an average of 200° to 400° F. when compared to the prior six-week period before the fine ore material is added in the manner described. Other thermocouples in the furnace stack drop by 50° to 100° F. In addition, the furnace coke rate decreases by approximately 60 pounds of coke per ton of hot metal produced when compared to the periods immediately preceding the use of this invention. This example is carried on for a six-week period, and demonstrates the feasibility of improving furnace lining life and efficiency by the addition of fine ore material to the burden.

We claim:

1. In the method of producing metal in a shaft furnace containing one or more substantially horizontal layers of coke and one or more separate substantially horizontal layers of ore above and/or below the coke layers, said layers being positioned across the furnace cross section, and wherein greater than about 80 percent of the ore therein is present in the form of pellets, the improvement comprising separating fine ore material from said pellets, and then adding the separated fine ore material on a controlled basis to said furnace adjacent to the walls of said furnace to reduce the gas flow adjacent said walls and thereby protect the furnace lining, and wherein subsequent to separating said fine ore material from said pellets and prior to adding said fine ore material to said furnace, the ultrafine fraction of said ore material which would present material handling problems when wet or be blown out of the furnace by the hot furnace gases is either (1) separated from said fine material which is added to said furnace, or (2) micro-pelletized prior to addition to said furnace in order to provide a material having suitable properties for flowing into said furnace.

2. Method as in claim 1 wherein said ore is iron ore.

3. Method as in claim 1 wherein the micropellets formed have an average diameter of up to about 5 mm.

4. Method as in claim 1 wherein the micropellets formed have an average diameter of up to about 3 mm.

5. Method as in claim 1 wherein said fine ore material is separated from said pellets by screening.

6. Method as in claim 5 wherein said ultrafine fraction is removed from said fine material by screening or air classification.

7. Method as in claim 6 wherein the fine material after removal of the ultrafine fraction has an average particle diameter of between about 1 mm and about 7 mm.

8. Method as in claim 6 wherein the fine fraction after removal from the ultrafine fraction has an average particle diameter of between about 2 mm and about 5 mm.

9. Method as in claim 1 wherein the micropellets are formed by means of a balling device.

10. Method as in claim 9 wherein the micropellets are formed by means of a balling disc.

11. Method as in claim 9 wherein said micropellets are formed by adding one or more binders to said fine material.

12. Method as in claim 9 wherein said micropellets undergo the step of drying prior to being charged into said shaft furnace.

13. Method as in claim 2 wherein said shaft furnace is fueled with coke.

14. Method as in claim 2 wherein said shaft furnace is a direct-reduction shaft furnace.

15. Method as in claim 4 wherein more than about 90 weight percent of the ore in the shaft furnace is present in the form of pellets.

16. Method as in claim 4 wherein substantially all of the ore therein is in the form of pellets, other than iron-bearing recycled materials and that added as fine ore material adjacent to the walls of said furnace.

17. Method as in claim 4 wherein the amount of said fine material separated from said pellets amounts to between about 1 and about 20 percent by weight based upon the total of the weight of said pellets and said fine material.

18. Method as in claim 4 wherein the average amount of said fine material separated from said pellets amounts to between about 3 and about 10 percent by weight based upon the total of the weight of said pellets and said fine material.

19. Method as in claim 2 wherein said pellets have a range of average diameter between about 5 mm and about 20 mm and wherein said fine ore material has a screen size of less than 6 mm.

20. In the method of producing iron in a shaft furnace having separate substantially horizontal layers of coke and ore above and/or below one another, and wherein greater than about 90 percent of the iron ore therein is present in the form of pellets, the improvement comprising (1) separating the fine material having an average diameter less than about 7 mm from said pellets, and then (2) adding this fine material in a controlled manner to said furnace adjacent to the walls of said furnace, and wherein said fine material is re-screened or micropelletized prior to addition to said furnace in order to provide a material having suitable properties for flowing into said furnace, and wherein the amount of said fine material separated from said pellets is between about 1 and about 20 percent.

21. Method as in claim 20 wherein the micropellets are formed by means of a balling disk or a flying saucer.

22. Method as in claim 20 wherein said shaft furnace is fueled with coke.

23. Method as in claim 20 wherein substantially all of the iron ore in said shaft furnace is present in the form of pellets.

24. Method as in claim 20 wherein said final separated fine material is obtained by a method of first screening said iron ore pellets and then either re-screening or air classifying the resulting fine material to remove the ultrafine fraction which would present serious handling problems when wet or be blown out of the blast furnace by hot gas streams when introduced into said furnace.

* * * * *

UNITED STATES PATENT AND TRADEMARK OFFICE
CERTIFICATE OF CORRECTION

PATENT NO. : 4,436,552

DATED : March 13, 1984

INVENTOR(S) : Melvin C. Chang and John L. Howell

It is certified that error appears in the above-identified patent and that said Letters Patent is hereby corrected as shown below:

Column 5, Claim 15, line 1, change "4" to -- 2 --.

Column 5, Claim 16, line 1, change "4" to -- 2 --.

Column 5, Claim 17, line 1, change "4" to -- 2 --.

Column 6, Claim 18, line 1, change "4" to -- 2 --.

Signed and Sealed this

Twenty-eighth Day of August 1984

[SEAL]

Attest:

Attesting Officer

GERALD J. MOSSINGHOFF

Commissioner of Patents and Trademarks